Aug. 18, 1942.  C. BREBECK  2,293,108
SINE BAR
Filed Jan. 21, 1942  3 Sheets-Sheet 1
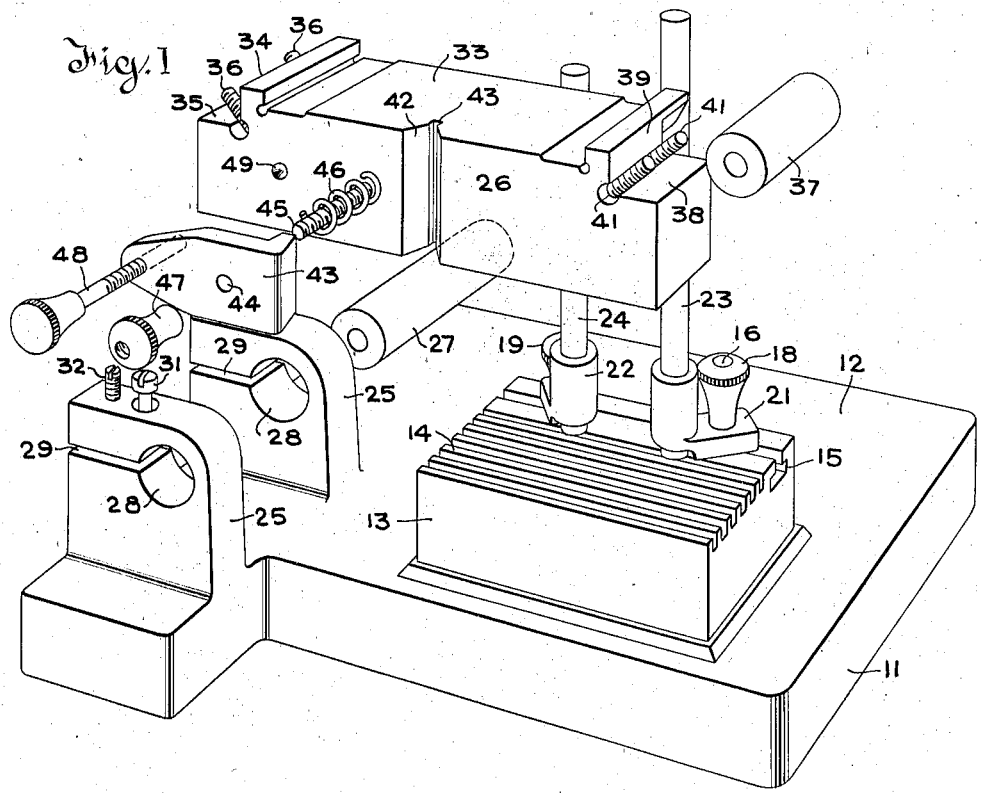
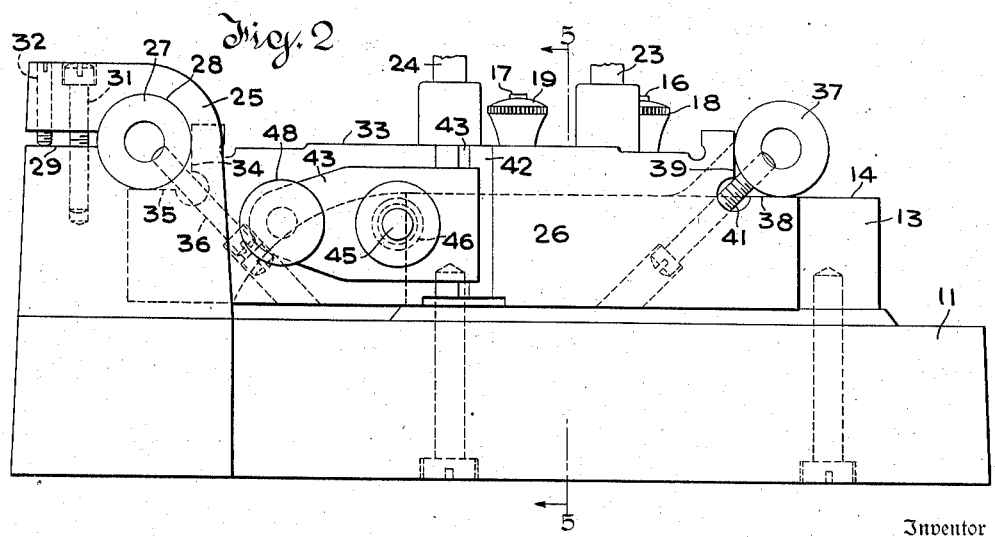
Inventor
Charles Brebeck
By Dodge and Im
Attorneys Aug. 18, 1942.           C. BREBECK           2,293,108
SINE BAR
Filed Jan. 21, 1942           3 Sheets-Sheet 2
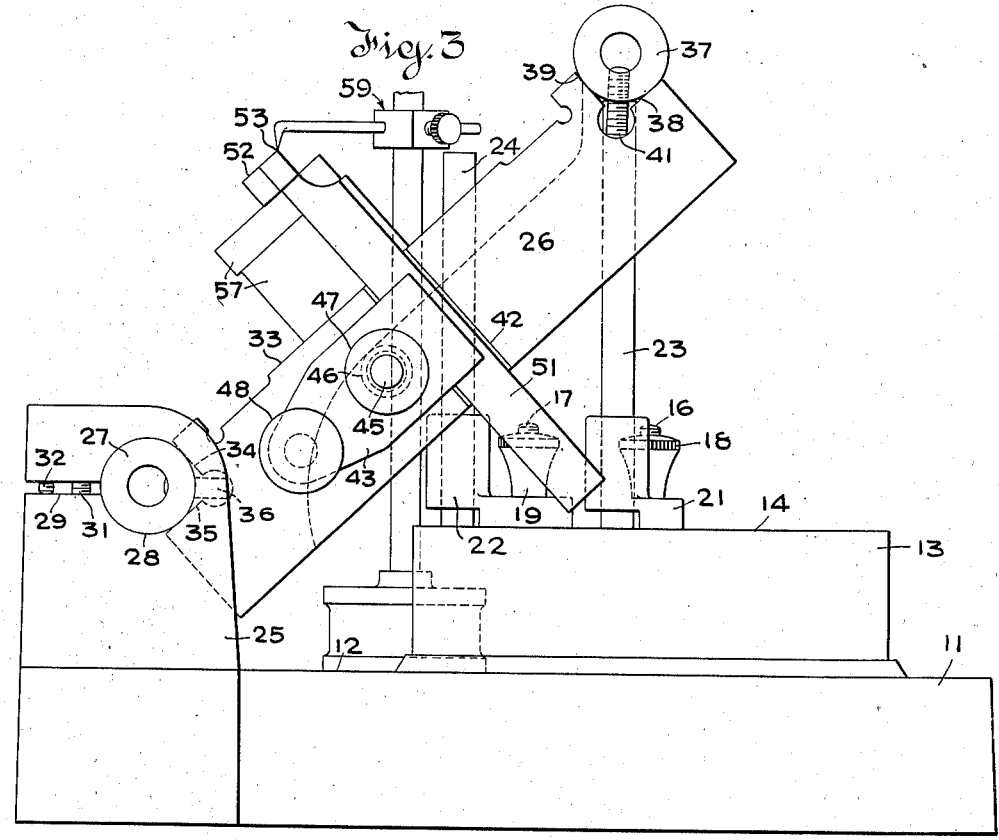
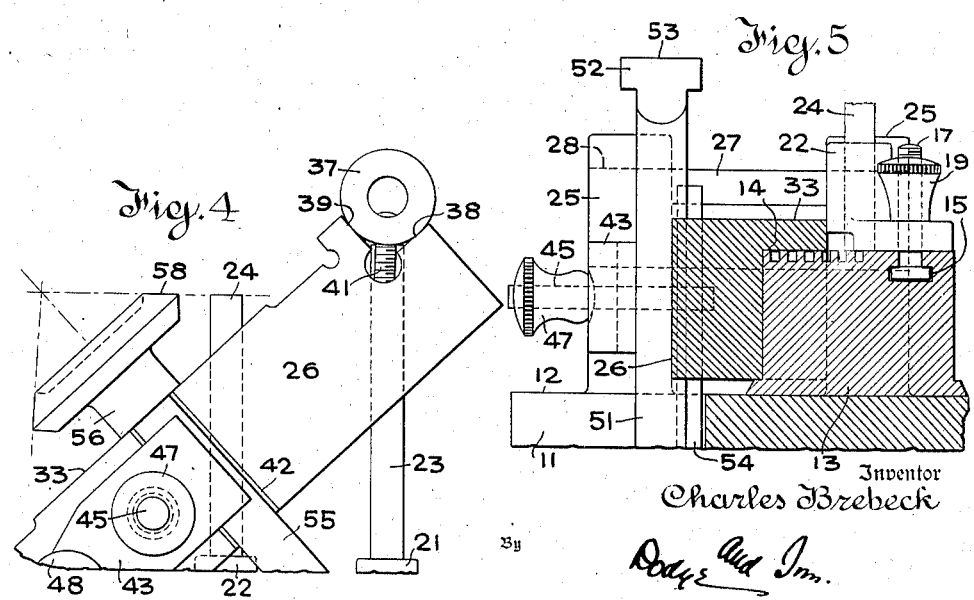
Inventor
Charles Brebeck
By Dodge and Imm
Attorneys Aug. 18, 1942.   C. BREBECK   2,293,108
SINE BAR
Filed Jan. 21, 1942   3 Sheets-Sheet 3
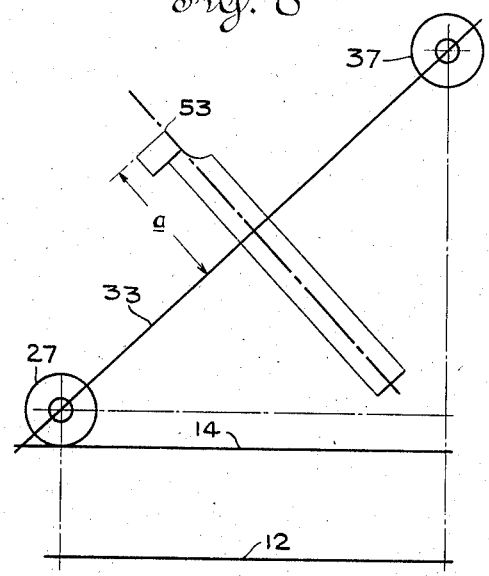
Fig. 8
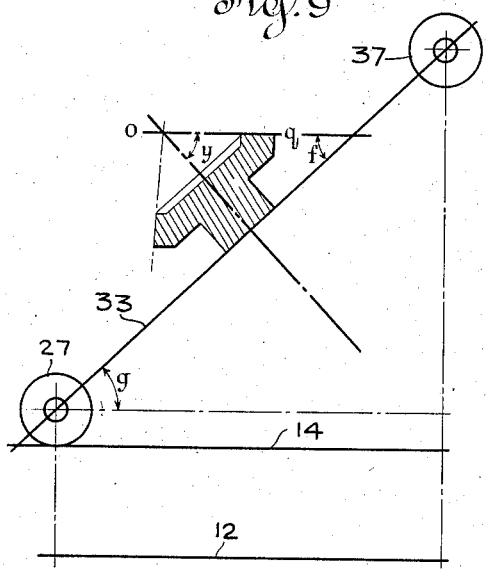
Fig. 9
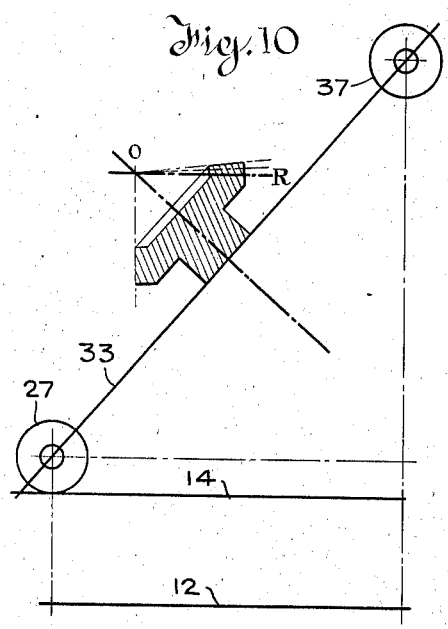
Fig. 10
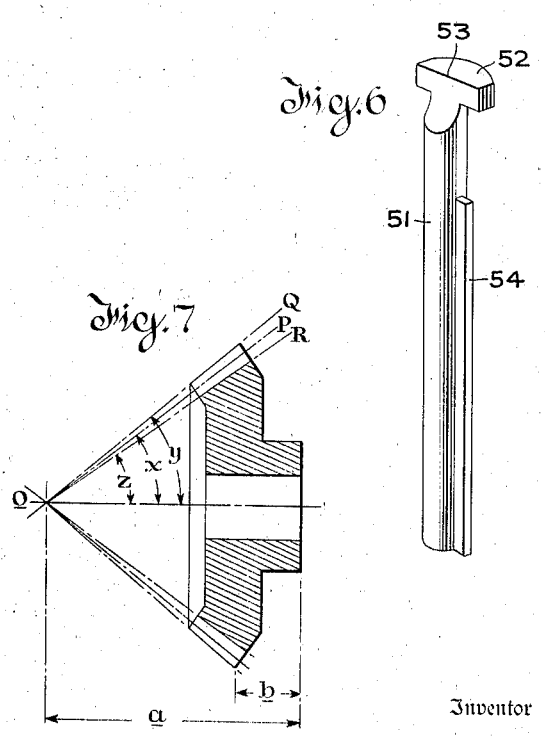
Fig. 6
Fig. 7
Inventor
Charles Brebeck
Attorneys Patented Aug. 18, 1942

2,293,108

UNITED STATES PATENT OFFICE 2,293,108

SINE BAR

Charles Brebeck, Herkimer, N. Y.

Application January 21, 1942, Serial No. 427,677

7 Claims. (Cl. 33—174)

This invention relates to devices for setting up machines for the manufacture of bevel gear blanks and for checking such blanks and the gears made therefrom. The purpose of the invention is to provide a device availing of the precision of the well-known sine bar, and capable of being set up directly from the dimensional data ordinarily given on drawings of bevel gears.

To assure the simplest manipulation, the invention contemplates an arrangement of the sine bar such that the fiducial plane of the sine bar is radial with respect to the axis on which the sine bar swings. This arrangement is believed to be broadly new in the sine bar art, and desirable for general use.

The invention further contemplates the addition to a sine bar of an aligning seat which will receive alternatively and will similarly align, either a special apex-defining setting up bar, or a mandrel on which the gear blank to be measured may be rotatably mounted. In such an arrangement, the mandrel and the setting up bar are preferably selectively mounted with their axes identically positioned, but in any event they are so positioned that their axes lie in a definite plane parallel with the sine bar axis and at an angle of 90° to the fiducial plane of the sine bar. The latter satisfies the requirements, but the former is preferred.

The set up bar is used in conjunction with suitable gauges or measuring devices, commonly gauge blocks, to define a plane passing through the apex of the pitch cone of the bevel gear and tangent to such pitch cone. The same geometrical principles enable the device to be used for determination of or indication of the plane tangent to the addendum cone and similarly of the plane tangent to the root cone.

Heretofore, the method of setting up to manufacture and the method of checking precise bevel gears, or blanks, for precise bevel gears have required complicated apparatus and rather difficult computation and manipulation. Even then, recourse to trial and error was necessary.

The present invention derives the desired dimensions directly from the usual dimensions used on drawings of the gear itself, avoids trial and error methods, and gives direct readings which may be availed of to secure precision.

Perhaps the most important theoretical aspect of the invention is that it refers all dimensions and all angles to the axis of the gear and to the end face of the hub of the gear. These are determinative factors in the functional positioning of the gear when in operation and hence are critical, particularly when adjustments are not permitted and back-lash must be held to a minimum.

The settings of the test device can be made by use of gauge blocks, which are satisfactory laboratory or toolroom instruments. For mass production, however, rod gauges dimensioned and marked for identification according to each particular gear, are preferred, because they are less subject to injury, involve minor losses in case of injury, can be used more rapidly, and are subject to fewer manipulative errors in the hands of ordinary machine operatives.

An embodiment of the invention particularly suited to use by machine operatives because it includes in its structure an auxiliary surface plate, will now be described with reference to the accompanying drawings, in which:

Fig. 1 is an exploded perspective view of the complete device in which various components are separated to indicate their form and the mode of assembly.

Fig. 2 is a front view of the device of Fig. 1 completely assembled and the sine bar lowered against the anvil.

Fig. 3 is a similar view showing the sine bar set for the angle corresponding to the addendum cone and showing the set up bar in place with block gauges interposed between the head of the set up bar and the fiducial face of the sine bar to determine the position of the set up bar.

Fig. 4 is a fragmentary view similar to a portion of Fig. 3. In this view the position of the sine bar is unchanged but a mandrel has been substituted for the sine bar. A gear blank is shown mounted on the mandrel.

Fig. 5 is a section on the line 5—5 of Fig. 2.

Fig. 6 is a perspective view of the set up bar.

Fig. 7 is an axial section of a bevel gear showing dimensions which are customarily given and indicating the addendum cone, the pitch cone, and the root cone of such a gear.

Fig. 8 is a diagram indicating the geometry involved in the positioning of the set up bar to determine the apex of the gear cones. This figure corresponds to conditions illustrated in Fig. 3.

Fig. 9 is a similar diagram corresponding to the conditions illustated in Fig. 4.

Fig. 10 is a diagram similar to Fig. 9 but illustrating the determination of the angle of a root cone element.

The sine bar as means for mechanically setting desired angles or for measuring unknown angles has been extensively used. For uniformity in terminology in the specification, the sine will be defined as the ratio of the "perpendicular" to the "radius." While the reference plane to which such perpendicular is taken is normally a horizontal plane, the terms "horizontal" and "vertical" will be avoided. It is probably unnecessary to add that the sine is translated into degrees of angle by the use of table and natural sines.

Many sine bar mechanisms are intended for use with a separate surface plate which serves as the reference plane for measurements, but according to the present disclosure, the equivalent of this surface plate is embodied in the base of the structure, and an elevated anvil is used to afford a parallel plane from which at least the perpendicular is measured. The radius, of course, is a fixed dimension and is the distance between centers of the two "buttons" on the sine bar, the term "buttons" being used in the generic sense familiar in the sine bar art.

Referring first to Fig. 1, the device comprises a base 11 whose top face 12 is finished to a true plane. Rising above this plane surface 12 is the so-called anvil 13 having a top plane face 14 which is strictly parallel with the face 12 of the base. The face 14 is preferably, but not necessarily, grooved, as shown, and has a guide slot 15 to receive the heads of two adjustable bolts 16 and 17. These, with their thumb nuts 18 and 19, afford means for adjustably clamping retainers 21 and 22 for rod gauges 23 and 24. The structure of the retainers is clearly shown in the drawings. The slot 15 is close to the rear edge of the anvil 13 and parallel therewith and also with the plane in which the sine bar swings, as will be apparent from a consideration of the structure hereafter described.

The retainers 21 and 22 comprise vertical tubular open ended sockets which receive the rod gauges 23 and 24 respectively, and position these rod gauges so that their lower ends rest fairly upon the fiducial plane surface 14 of the anvil 13. The retainers are cut away at their lower ends, as shown, so as to expose the lower ends of the rods, permitting the operative to check their position and to assure himself that the gauge rods actually seat on the top face 14 of the anvil. The vertical height of the face 14 of the anvil has an important relation to the sine bar which will be explained.

At one end of the base 11 are two identical upstanding lugs 25 which are spaced to receive between them the sine bar, generally indicated by the numeral 26. These lugs are accurately bored, as indicated at 28, in a direction parallel with the surface 12 of the base, to form bearings to receive the cylindrical button element 27. This button element is fixed to the sine bar 26, as hereinafter explained, and rotates in the bearings formed by the bores 28. Each lug is slotted to its bore, as indicated at 29. To adjust the bearings 28 so as to assure a close working fit for the two ends of the button 27, two oppositely acting screws are provided, a tension screw 31 and a thrust screw 32 (see Fig. 2). The sine bar 26 has a fiducial face 33 which is a plane surface radial with respect to the axis of the button 27.

As a convenient means of accurately positioning and connecting the button 27 with bar 26, two positioning plane surfaces 34 and 35 are formed at right angles to each other near the end of the sine bar 26, and the button 27 is held thereagainst by two machine screws 36 arranged obliquely as clearly shown in Fig. 2. The heads of the screws are received in countersinks in the sine bar 26 and their ends are threaded into radial holes in the button 27. The second button is a similar cylindrical member 37 which is mounted against plane surfaces 38 and 39 and held by machine screws 41 (see Fig. 2). These screws are located similarly to the screws 36 already described.

The button 37 is longer than the seating surface 38 and is exposed at the rear side of the bar 26 (as viewed in Figs. 1 and 2). This exposure is to permit engagement with the rod gauge 23 or other gauging means which determines the "perpendicular." The desired effect is secured by forming the sine bar 26 with an angular cross section, as best indicated in Fig. 5 so that the major portion of the bar swings down past the front of the anvil 13 while the flange portion thereof and the button overlie the anvil, the button engaging the anvil in the lowermost position of the sine bar.

The two buttons 27 and 37 are shown as tubular, an arrangement which is significant only as it facilitates hardening operations.

The geometry of the arrangement is important and can best be understood by reference to Fig. 2 which shows the sine bar in its lowest position. The radial fiducial plane surface 33 is then parallel with the top face 14 of the anvil (and also with the top face 12 of the base), and button 37 is tangent to the anvil.

Stated differently, the plane of the surface 14 is always tangent to the lower face of the button 27 and is tangent to the button 37 when the fiducial face 33 of the sine bar is parallel with the reference surfaces 14 and 12.

The distance between centers of the buttons 27 and 37 is conveniently 5" or 10", the latter giving natural sine ratios directly in terms of the perpendicular measured in inches, and the former requiring simply a correction factor of two for a similar result. The valuable thing in the tangent arrangement of the fiducial surface 14 is that perpendiculars are always measured from the surface 14 to the lowermost point on the button 37. While a rod gauge 23 is shown, familiar practice of stacking gauge blocks under the button may be used whenever preferred.

The perpendicular is thus measured directly by the gauge blocks or by the rod gauge without the addition or subtraction of any constant. In this detail, the sine bar as such is believed to be a definite advance in the art. Without changing the principle of the instrument, the invention offers decided manipulative advantages, particularly for unskilled operatives.

Formed in the front face of the sine bar 2 and bisecting the interval between buttons 27, 37 is a notch 42 comprising two plane surfaces which converge, preferably at 60°. An accurately formed relief groove 43 is provided partly as an expedient facilitating manufacture and partly to serve as positioning means to be described hereafter.

The purpose of the groove 42 is to position a cylindrical mandrel or a cylindrical setting bar with its axis perpendicular to the fiducial plane 33 of the sine bar and bisecting the interval between the centers of the buttons 27, 37. If these two cylindrical members have equal diameters they will be identically positioned by the groove, but it is not strictly necessary that their diameters be equal. If they have different diameters they will nevertheless each be positioned with their axes perpendicular to the plane 33 (and consequently parallel with each other) and they will be at the same distance from the axis of the button 27. These are the critical requirements. It is, however, preferred to use a mandrel and a setting bar of the same diameter in the interest of producing identical positions under the two alternative set ups.

Clamping means are afforded comprising the L-shaped lug 43 which has a hole 44 to receive freely the threaded stud 45. This stud is fixed in the sine bar at one side of the groove.

A coil compression spring 46 encircles the stud and a thumb nut 47 is threaded on the end of the stud so as to force the lug 43 toward the sine bar against the reaction of the spring 46. A thrust thumb screw 48 is threaded in the tail of the lug 43 and engages a positioning countersink 49 formed in the sine bar 26 to receive it. This device serves as convenient means for clamping alternatively the mandrel or the set up bar tightly in the positioning groove 42. Any equivalent means might be substituted.

The use of the groove 42 is preferred to a hole drilled through the bar 26 because the groove will receive and position members of various different diameters whereas any drilled hole imposes limits on size.

The set up bar is indicated at 51 in Fig. 3 and the form of the bar is clearly shown in perspective in Fig. 6. The shank of the bar is simply a straight cylindrical rod having an enlarged head 52 of definite and known thickness which is milled away at one side to a diametric line 53. This diametric line 53 must be parallel at all times with the axis of the fulcrum button 27. To ensure attainment of this result, the shank of the bar 51 is provided with a projecting key 54 which accurately fits the relief slot 43 heretofore described. When the set up bar is properly positioned, the line 53 passes through the apex of the gear cone to be tested. The mode of correctly positioning the set up bar will be explained after the dimensioning of the gear blank has been set forth.

The mandrel which replaces the set up bar and serves to position the gear blank is indicated at 55 in Fig. 4. It may be a simple cylindrical bar on which the gear blank, generally indicated by the numeral 56 in Fig. 4, is journaled. In connection with Fig. 4, it is important to observe that the axis of the mandrel 55 coincides with the axis of rotation of the gear blank and that the position of the gear blank in the direction of its axis of rotation is determined by engagement of the hub of the blank with the fiducial surface 33 of the sine bar. Since a similar relationship will ultimately control the meshing position of the finished gear, it is obvious that the gear is mounted on the sine bar with direct relation to the controlling axis and surface.

As a preliminary to a discussion of the use of the device, it will be helpful to outline certain aspects of the design of bevel gears.

Bevel gears are used to connect two shafts whose axes lie in a common plane and intersect. The design of the teeth is such as to give the same effect as would be had by two cones rolling together, i. e. if one shaft has uniform angular velocity, so will the other. These two imaginary cones are called the pitch cones and their apices occupy a single point which is at the intersection of the axes of the two shafts. These axes, of course, are also the axes of the cones.

In a pair of mating gears, the angularity of the pitch cone elements of each gear with reference to the gear axes is determined by two things, (1) the angle between the cone axes and (2) the angular velocity ratio. The size of the gear will be determined by the load to be transmitted. Once the pitch cone is determined, the tooth pitch, and the angularity of the root cone and addendum cone are determined by methods which are more or less conventional, and not here involved except that they lead to the adoption of some definite addendum cone and root cone as final and known design factors. The addendum cone obviously is an important factor in the form of the gear blank. The root cone controls certain tooth cutting operations.

Bevel gears must be held in mesh by a thrust bearing and the usual practice is to use the end of the gear hub as one part of such thrust bearing.

In any gear we thus have as controlling dimensions (1) the distance $a$ from the apex $o$ to the end of the gear hub and (2) the angle $x$ which is the pitch cone angle. The addendum cone angle $y$ and the root cone angle $z$ are also important, as stated. The distance $b$ from hub end to the crown line is usually also given on gear drawings.

Assume a gear blank having a known dimension $a$ and a known addendum angle $y$ is to be checked with the gear mounted, as shown in Fig. 4.

The first step is to set sine bar 26 so that $o-q$ (Fig. 9) is parallel with surface 12. The sine bar angle $g$ equals the angle $f$ and angle $f$ is $90°$ minus angle $y$. The desired perpendicular is proportional to $\sin(90°-y)$ or $\cos y$. Since $y$ is known, the setting can readily be made using some proper gauge such as rod gauge 23 to determine the perpendicular.

Having set the bar 26 to the correct angle, the set up bar 51 is placed and adjusted to establish dimension $a$ (see Fig. 8). As indicated in Fig. 3, this may be done by the use of gauge blocks 57. The set up bar is then clamped and the perpendicular from surface 12 to edge 53 is measured by a surface gauge such as the gauge 59 supported on surface 12 (see Fig. 3).

Then mandrel 55 is substituted for the set up bar and gear blank 56 is mounted, as shown in Fig. 4. If the blank is accurate, the surface gauge set as already described should accurately trace the element 58 (Fig. 4) of the addendum cone. In other words, the element is a line parallel with plane 12 and passing through apex $o$ as defined by edge 53 on the set up bar.

The gear blank may be rotated to check for concentricity.

The setting of the surface gauge may be perpetuated by a rod gauge 24 where a large number of similar blanks are to be checked so that manufacture of the rod gauge is justified.

Fig. 10 shows the sine bar set to a new angle to locate the element OR of the root cone. The manipulation is essentially similar to that described, and the resulting reading may be used to determine the angle of cut in forming teeth.

The embodiment above described is illustrative and not in any sense limiting as many modifications within the scope of the invention may be made.

What is claimed is:

1. In a sine bar device, the combination of a base having a plane reference surface, and hinging means whose axis is parallel with said surface; a sine bar hinged by said hinging means and having a plane reference surface which passes through the hinge axis; a button whose gauging surface is a surface of rotation mounted on said sine bar with its axis in the plane reference surface of the bar and parallel with the hinge axis, the perpendicular distance from the hinge axis to the reference surface of the base being such that the reference surface of the sine bar is parallel with the reference surface of the base when the button is in contact therewith.

2. In a sine bar mechanism, the combination of a base having a plane reference surface; a sine bar having a pair of cylindrical buttons of equal diameter spaced a predetermined distance with their axes parallel with each other and transverse to the sine bar, said sine bar having a plane reference surface which passes through the axes of said buttons; and hinging means carried by the base and engaging one of said buttons to cause the sine bar to swing about the button in a plane perpendicular to the reference plane of the base, the last named plane being tangent to the button about which the sine bar swings.

3. In a sine bar device, the combination of a base having a plane reference surface, and hinging means whose axis is parallel with said surface; a sine bar hinged by said hinging means and having a plane reference surface which passes through the hinge axis; a button whose gauging surface is a surface of rotation mounted on said sine bar with its axis in the plane reference surface of the bar and parallel with the hinge axis, the perpendicular distance from the hinge axis to the reference surface of the base being such that the reference surface of the sine bar is parallel with the reference surface of the base when the button is in contact therewith; and mechanical means carried by the sine bar for defining an axis normal to the reference plane on the sine bar and bisecting the interval between the axis of the hinge and button.

4. In a sine bar device, the combination of a base having a plane reference surface, and hinging means whose axis is parallel with said surface; a sine bar hinged by said hinging means and having a plane reference surface which passes through the hinge axis; a button whose gauging surface is a surface of rotation mounted on said sine bar with its axis in the plane reference surface of the bar and parallel with the hinge axis, the perpendicular distance from the hinge axis to the reference surface of the base being such that the reference surface of the sine bar is parallel with the reference surface of the base when the button is in contact therewith; mechanical means carried by the sine bar for defining an axis normal to the reference plane on the sine bar and bisecting the interval between the axes of the hinge and button; and a set up bar positioned by said axis defining means and including indicating means and associated means for coacting with a gauge to set the indicating means to define a point in space on said normal axis and at a desired distance from the reference plane of the bar.

5. In a testing device, the combination of a base having a plane reference surface; a bar member having a plane reference surface; precision means for adjusting said bar member relatively to said base to establish a desired dihedral angle between the respective reference surfaces thereof; positioning means carried by the bar for defining an axis normal to the reference plane of the bar; a set up bar adjustably positioned by said axis defining means and including indicating means on the defined axis; and associated means for coacting with a gauge to set the indicating means to define a point on said normal axis at a desired distance from the reference plane of the bar.

6. In a testing device for gears, the combination of a base having a plane reference surface; a bar member having a plane reference surface; precision means for adjusting said bar member relatively to said base to establish a desired dihedral angle between the respective reference surfaces thereof; positioning means carried by the bar for defining an axis normal to the reference plane of the bar; a set up bar capable of being adjustably positioned by said axis defining means and including indicating means on the defined axis and associated means for coacting with a gauge to set the indicating means to define a point on said normal axis at a desired distance from the reference plane of the bar; and means adapted to be received by said axis defining means in lieu of said set up bar and serving to position a bevel gear to be tested with its axis coincident with said normal axis and its hub positioned by the reference surface of the bar.

7. In a testing device for gears, the combination of a base having a plane reference surface adapted to receive a surface gauge for checking the element of a bevel gear cone; a bar member having a secondary plane reference surface; precision means for adjusting said bar member relatively to said base to establish a chosen dihedral angle between the main and the secondary reference surfaces; positioning means carried by the bar for supporting a gear blank or the like to be tested with its axis normal to the secondary reference surface; and indicating means carried by the bar and capable of being set to indicate the position of the apex of such gear relatively to the secondary gauging surface.

CHARLES BREBECK.